No. 679,577. Patented July 30, 1901.
H. L. SCHAFFNER.
PENDULUM LEVEL.
(Application filed Feb. 23, 1901.)

(No Model.)

Henry L. Schaffner, Inventor.

UNITED STATES PATENT OFFICE.

HENRY L. SCHAFFNER, OF FLORENCE, ITALY.

PENDULUM-LEVEL.

SPECIFICATION forming part of Letters Patent No. 679,577, dated July 30, 1901.

Application filed February 23, 1901. Serial No. 48,528. (No model.)

*To all whom it may concern:*

Be it known that I, HENRY L. SCHAFFNER, of Florence, Italy, have invented certain new and useful Improvements in Pendulum-Levels; and I hereby declare that the following is a full, clear, and exact description thereof, reference being had to the accompanying drawings, which form part of this specification.

This invention is an improvement in pendulum-levels or clinometers, in which the inclination of the instrument is determined by a pendulum and a suitable index or scale, the pitch being readily determined by observing the position of the indicator on the pendulum relatively to the scale.

The present invention consists in the novel construction and combination of parts in a clinometer summarized in the claims following the description, an efficient form of such instrument being shown in the accompanying drawings, in which—

Figure 1:
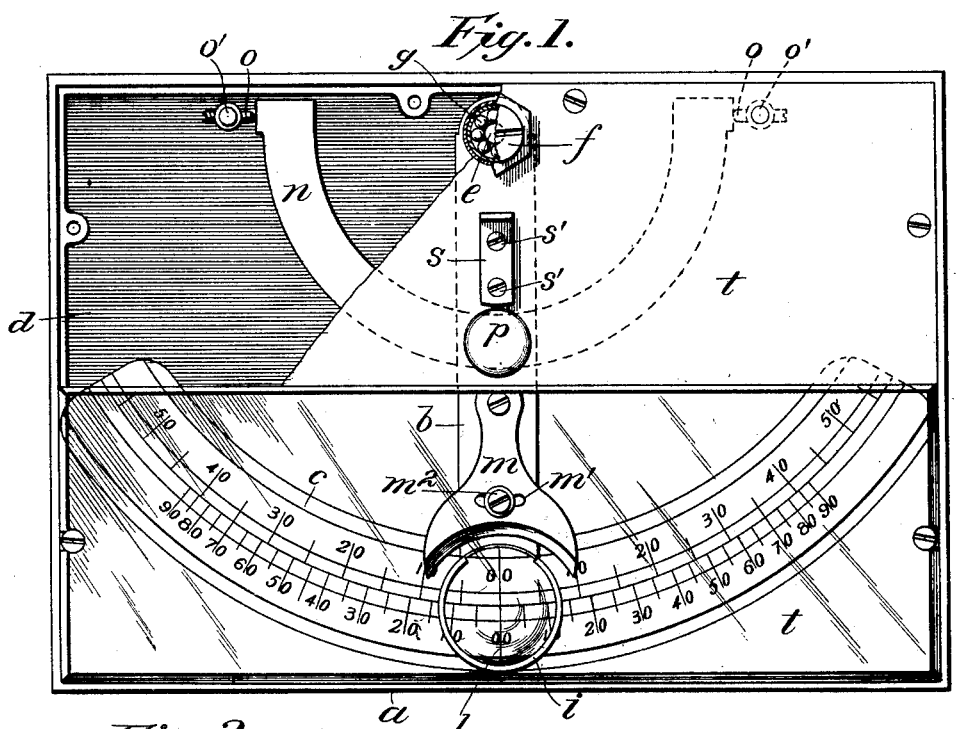
Figure 2:
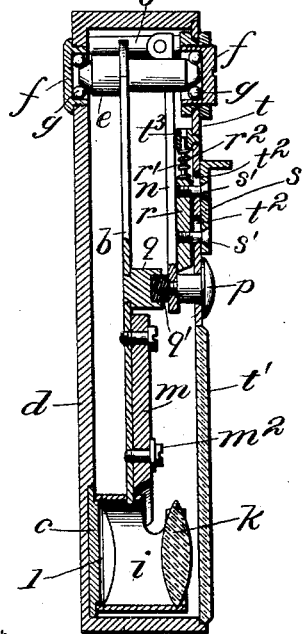
Figure 3:
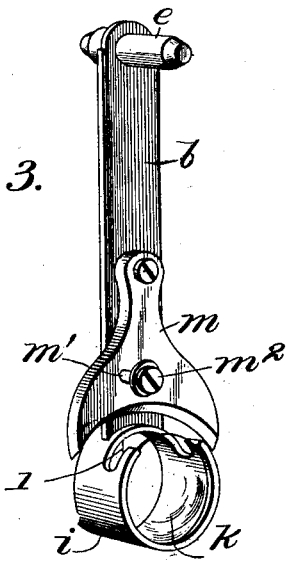

Figure 1 is a face view of the clinometer, the front side wall thereof being partly broken away to show interior parts. Fig. 2 is a vertical transverse central section therethrough. Fig. 3 is a detail.

Referring to said drawings, $a$ designates the base of the casing of the clinometer, said base being perfectly straight and designed for application to a surface whose inclination is to be determined. Preferably the base forms one side of a rectangular frame. The back $d$ of the casing is perpendicular to the base. The front of this casing is composed of a metallic upper half $t$, and the lower portion $t'$ is formed of glass, through which the scale or index $c$, attached to the back $d$, can be observed at all times. Pivoted centrally within the case and near the top thereof (considering the part $a$ as the bottom of the case) is a pendulum or gravital arm carrying the indicator. This pendulum consists of a strip of metal $b$, preferably resilient, which is attached at its upper end to a short shaft $e$, journaled on ball-bearings $g$ within cups $f$, attached to the back and front of the case, as shown, to permit the pendulum to swing with the greatest ease. On the lower end of the strip $b$ is an annulus $i$, which carries the indicating-hair $l$, strung across in the central vertical line of the pendulum, and in the front of this annulus is a magnifying-glass $k$, through which the hair can be observed, and which by its magnifying power greatly facilitates the reading of the marks on the scale. Pivoted on the pendulum above this annulus $i$ is a weight $m$, which may be adjusted slightly laterally by means of the slot $m'$ and the screw $m^2$, and this weight is used in adjusting the instrument to obtain perfect alinement of the hair $l$ with the zero-marks on the scale when the base $a$ is absolutely level, and when once adjusted in this manner the weight $m$ is permanently fastened.

On the plate $b$ above the weight $m$ is attached a stud $q$, which is preferably provided with a yielding cushion or spring $q'$ on its outer face, adapted to normally lightly contact with the inner face of a semicircular bar $n$, which is bent on an arc corresponding to that circumscribed by the point $q$ as the pendulum swings on its pivot. The bar $n$ is pivoted at its ends on the screws $o$, tapped through studs attached to the back of the case, as shown in the drawings. To the bar $n$ is attached a button $p$, which projects through an opening in the case. Above button $p$ is a slide $s$, which is connected by bolts $s'$ with a latch $r$ inside the cover, the bolts $s'$ playing through vertical slots $t^2$ in the cover, so that the bolt can be operated from the exterior by moving slide $s$. The bolt is provided with a shank $r'$, which plays through an opening in a stud $t^3$, attached to the cover, and a spring $r^2$ is placed on the shank between the latch and the stud, so as to normally depress the latch. The latch $r$ is normally raised and rests upon the upper edge of the bar $n$, so as to prevent the latter interfering with the free gravital movement of the pendulum; but if it is desired to lock the pendulum at any time the button $p$ is pressed inward, so as to force the bar $n$ inward until latch $r$ drops in front thereof and will cause the bar to bind the pendulum in whatever position it may then be, the strip $b$ yielding sufficiently to allow the bar $n$ to force the annulus $i$ against the scale $c$ and hold it there until the latch $r$ is released.

The scale $c$ is made on or secured to the back of the case on an arc conforming to that struck by the annulus $i$ as the pendulum swings, and this scale is double, the figures above the median line indicating the degrees of inclination of the base from the perpendicular and the figures below the median line showing the percentage of the inclination of the base to a horizontal plane.

The mode of operation of the clinometer will be obvious to those familiar with such instruments. By standing it upon the surface whose inclination is to be determined, the base $a$ being in contact with the surface, the pendulum gravitates to the right or left, according to the inclination of the surface, until it assumes a vertical position. By lightly tapping on the part $p$ with the finger the pendulum will more quickly assume the true vertical position. When it reaches this position, button $p$ is pressed inward, so as to bind the annulus of the pendulum against the scale and permit the latch $r$ to spring in front of the bar $n$, whereupon the pendulum will be held in such position, and the instrument may then be raised and inspected at leisure. When it is again to be used, the latch $r$ can be raised by lifting the plate $s$, as is obvious.

What I claim is—

1. In a clinometer, the combination of a case, a pendulum-indicator therein having a magnifying-glass in front of the indicating-scale, and a scale in the case in rear of the glass on the indicator; with a curved bar pivoted in front of said pendulum, and means for causing said bar to positively engage and lock the pendulum in any position to which it is gravitated.

2. In a clinometer, the combination of a case, a pendulum therein having an indicator on its lower end and a magnifying-glass in front of the indicator, and a scale in the case in rear of the indicator; with a contact-piece on said pendulum, a curved bar pivoted in front of the pendulum and adapted to contact with said piece, and means for causing said bar to forcibly engage said piece and lock the pendulum in any position to which it is gravitated.

3. In a clinometer, the combination of a case, a pendulum having an annulus on its lower end, an indicator in said annulus, and a magnifying-glass in front of said indicator, with a scale in rear of said indicator, a curved bar pivoted in front of the pendulum, and means for causing said bar to engage and lock the pendulum in any position to which it is gravitated.

4. In a clinometer, the combination of a case having a base, a pendulum-indicator pivoted above the base having an annulus on its lower end, an indicator in said annulus and a glass in front of said indicator, and a contact-piece on said pendulum; with a scale in rear of said indicator, a curved bar pivoted in front of said contact-piece adapted to contact therewith, and means for causing said bar to forcibly engage said piece and lock the pendulum in any position to which it is gravitated.

5. In a clinometer, the combination of the case, the pendulum pivoted therein, said pendulum consisting of a resilient metal strip having an indicator on its lower end; with a semicircular strip pivoted in the case in front of the pendulum adapted to contact therewith, and a bolt above said strip adapted to lock the same in engagement with the pendulum, substantially as described.

6. In a clinometer, the combination of the case, the pendulum pivoted therein consisting of a resilient metal strip having an annulus on its lower end provided with an indicator and a glass in front of the indicator, and a rock-shaft from which said pendulum is suspended; with a curved strip $n$ pivoted in the case in front of the pendulum adapted to contact therewith, and a spring-pressed bolt above said strip adapted to lock the same in engagement with the projection on the pendulum, substantially as described.

7. In a clinometer, the combination of a case having a base, a pendulum pivoted above the base having an indicator and a magnifying-glass on its lower end, and means for locking said pendulum in any position it assumes; with a scale in rear of said indicator having one series of marks indicating the degrees of inclination and another series of marks indicating the percentage of inclination assumed by the base relative to a horizontal plane, substantially as described.

8. In a clinometer, the combination of the case, the pendulum pivoted therein consisting of a resilient metal strip having an annulus on its lower end provided with an indicator and magnifying-glass in front of the indicator, with a scale fixed in the case behind the indicator, a laterally-adjustable weight on said pendulum above the annulus, and means for locking the pendulum in any position it assumes, substantially as described.

In testimony that I claim the foregoing as my own I affix my signature in presence of two witnesses.

HENRY L. SCHAFFNER.

In presence of—
EUGENIO CECCHINI,
SPIRETO BERNARDO.